UNITED STATES PATENT OFFICE.

JOSEPH W. SHEPPARD, OF NEW YORK, N. Y.

METHOD OF TREATING WOVEN WIRE IN MANUFACTURING WIRE-GLASS.

SPECIFICATION forming part of Letters Patent No. 646,132, dated March 27, 1900.

Application filed December 30, 1898. Renewed August 29, 1899. Serial No. 728,918. (No specimens.)

*To all whom it may concern:*

Be it known that I, JOSEPH W. SHEPPARD, a citizen of the United States, residing in the city, county, and State of New York, have invented a new and useful Improvement in Methods of Treating Woven Wire and Manipulation Thereof in the Manufacture of Wire-Glass, of which the following is a specification.

My invention relates especially to the treatment of woven wire and manipulation thereof in the manufacture of wire-glass, and has for its object the treatment and manipulation of such woven wire as to effectually prevent the rusting of the same before it is placed in position in the glass, thereby greatly improving the character of the said manufacture.

To attain the desired end my invention consists in certain novel and useful treatment of the woven wire, all of which will be hereinafter first duly described and then pointed out in the claim.

To present in clear and unmistakable language the nature and value of my said invention or discovery, I will describe the present status of the art of making wire-glass, the obstacles encountered in its manufacture, and show in what measure my discovery overcomes these obstacles, thereby aiding in producing a more perfect, and hence more marketable, product.

There are two separate and distinct processes used in the manufacture of wire-glass, one known as the "solid" and the other known as the "sandwich" process.

The solid process consists in forcing the sheets of woven wire into the solid molten mass of glass by means of rollers of various patterns, one having ridges on its surface that not only force the sheets of woven wire into the mass of glass, but it allows the molten glass to be pressed up through the meshes, which another roller having a smooth surface immediately following flattens out, and so is produced a sheet of wire-glass that has the woven wire solidly embedded between its surfaces.

The sandwich process consists in first rolling a sheet of glass upon the rolling-table, laying on it the sheet of woven wire, and then rolling over it a second sheet of molten glass, the processes following so close to one another as to be almost simultaneous.

In the manufacture of woven-wire sheets used in the manufacture of wire-glass an obstacle has been encountered that has been the cause of condemning a great many sheets of wire-glass by reason of the fact that the sheets of wire show rust spots in more or less quantity should they be kept for a few days or even hours between the time of its being woven and the time of its being used in the manufacture of wire-glass. These rust spots show themselves in the glass in a marked measure, owing to the fact that when the wire is first embedded in the hot or molten glass in either of the above-described processes the wire becomes heated to the temperature of the glass, and as there is a severe strain on it as the hot glass pressed by the rollers drags over the wire meshes the rust on the wire will, as it were, loosen its hold on the metal and stain the glass, causing what is known by the trade as "moss spots," thereby producing a disfigurement in the sheets of wire-glass that is an offense to the sight, an impediment to the light, and often causing it to be condemned as being unmarketable.

To overcome the difficulties here described, the manufacturers of the woven wire and the manufacturers of wire-glass have devised many methods—to wit, have coated the wire with various metals and other substances, but in each case the material used in the coating of the wire lets go its hold on the metal when the wire is heated, and its surfaces are subjected to the strain and rubbing of the glass as it is being pressed into shape between the rollers, and the result is the production of the objectionable smudge or moss spots, though in much larger quantity with the metallic-coated wire than with the wire showing its natural surface, even though it be rusted in spots. Therefore the idea of preserving the woven-wire sheets from rust by a metallic coating has been discarded.

The manufacturers then finding they were forced to use wire that shows its natural surface directed their attention to devise means to protect it from rust which was caused by moisture, either in the atmosphere or by moisture of the hands of the men who handled the wire. With this idea in view they have forced the men who attended the machines that wove the wire to wear gloves, so there should be no possibility of the bright wire being affected by the moisture from the hands; but this precaution has proved to be unavailing as far as rust spots were concerned, as it was found the atmosphere affected the wire at all times more or less, but at certain seasons of the year more than at others. To meet this obstacle, the wire when woven and in rolls was incased in paper or cloth and kept in dry rooms or shipped in dry cars, but all to no avail. The moss or smudge spots appear in so much of the glass as to make a serious item of expense in its manufacture, as the sheets that have much of this disfigurement are an unmarketable product.

Having related the obstacles encountered in the manufacture of perfect or acceptable sheets of wire-glass, I will now describe my discovery which pertains to the overcoming of these obstacles by so protecting and treating the woven wire that it can be kept an indefinite period, shipped any distance in any kind of weather, yet can be brought to the rolling-table as bright and clear and free from rust spots as when first woven, and this can be done at an infinitesimal expense of labor or money, thereby allowing all the sheets of woven wire to be used, whereas in the present state of the art so much of the woven wire is discarded by reason of the rust spots that do appear in spite of all the aforementioned precautions taken.

In addition to the aforementioned loss there is also the loss sustained by having to discard so many of the sheets of wire-glass that do in themselves show the disfigurements caused by the rust spots on the wire.

My invention or discovery consists in taking the woven wire as it comes from the weaving-machine and coating it with a covering of lime and in subsequent manipulations to be hereinafter described. This can be done by either sifting dry lime over the rolls of woven wire or the rolls can be dipped in a thick solution of lime and water, the latter being preferable. Should the rolls be dipped, then they should be immediately dried in an oven. In either case the rolls of woven wire should be protected by a covering of cloth or paper, and in this condition, as above described, they can be kept for any length of time without the fear of any rust spots appearing on the wire, as the lime will absorb the moisture that comes in contact with it and keep the wire bright and clear until it is desired for use. When it is desired to use the woven wire so covered, it should be cut into sheets of the requisite size, as is now the custom; but it should be done in this case while the lime is on the wire. When the sheets of wire have thus been cut the desired size, they should then be subjected to a bath of fast-running water, that will wash away every particle of lime. When this has been thoroughly done, they should then be placed in a hot oven heated from the bottom, having good ventilation at the top, so as to allow the free escape of steam. It is desirable to place this oven near the rolling-table on which the sheets of wire-glass are made, as then the sheets of wire, freed from the lime and water and having no rust spots on them, could be taken while they were hot and then embedded in the glass, thereby reaping a secondary advantage, which I will now describe.

In the manufacture of wire-glass it often happens that air-bubbles appear in such quantity between the two surfaces of the sheets of glass as to make many of them unmarketable. These bubbles are mostly caused by the cool-air coating of the wire becoming expanded when it is suddenly caught and confined in the molten glass, when it forms bubbles that cluster around the wire, or are pressed between the meshes, producing unsightly sheets of glass, making them unsalable. It therefore follows that if the sheets of woven wire be taken from the hot oven when the coating of air around the wire is expanded and immediately embedded in the molten glass a clear or much clearer sheet of wire-glass will be the result.

Having now fully described my invention, what I claim as new therein, and desire to secure by Letters Patent, is—

The herein-described method of treating woven wire and manipulation thereof in the manufacture of wire-glass, that is to say; first coating the woven wire with lime, removing the lime by means of a suitable bath, drying the woven wire, and then embedding the said wire in the glass, substantially as set forth.

Signed by me at New York, N.Y., this 29th day of December, 1898.

JOSEPH W. SHEPPARD.

Witnesses:
A. M. PIERCE,
CHAS. F. FOGG.